(12) United States Patent
Xie et al.

(10) Patent No.: US 12,466,283 B2
(45) Date of Patent: Nov. 11, 2025

(54) CURRENT REGULATION OVERCHARGE PROTECTION FOR VEHICLE BATTERY SYSTEMS

(71) Applicant: FCA US LLC, Auburn Hills, MI (US)

(72) Inventors: Zhentao Xie, Auburn Hills, MI (US);
Moustapha Diab, Royal Oak, MI (US);
Rudolf Kharpuri, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 569 days.

(21) Appl. No.: 17/983,651

(22) Filed: Nov. 9, 2022

(65) Prior Publication Data

US 2023/0150386 A1 May 18, 2023

Related U.S. Application Data (60) Provisional application No. 63/279,201, filed on Nov. 15, 2021.

(51) Int. Cl.
| | |
|---|---|
| *B60L 53/62* | (2019.01) |
| *B60L 53/66* | (2019.01) |
| *H02J 3/32* | (2006.01) |
| *H02J 7/00* | (2006.01) |
| *H02M 3/00* | (2006.01) |
| *H02M 3/158* | (2006.01) |

(52) U.S. Cl.
CPC ............... *B60L 53/62* (2019.02); *B60L 53/66* (2019.02); *B60L 2210/10* (2013.01); *B60Y 2200/91* (2013.01); *B60Y 2200/92* (2013.01); *H02J 3/322* (2020.01); *H02J 7/00304* (2020.01); *H02M 3/00* (2013.01); *H02M 3/1582* (2013.01); *H02M 3/1584* (2013.01)

(58) Field of Classification Search
CPC ...... B60L 53/62; B60L 53/66; B60L 2210/10; B60L 58/15; B60L 3/04; B60Y 2200/91; B60Y 2200/92; H02J 3/322; H02J 7/00304; H02M 3/00; H02M 3/1582; H02M 3/1584; Y02T 10/70
See application file for complete search history.

(56) References Cited

U.S. PATENT DOCUMENTS

| | | |
|---|---|---|
| 6,133,712 A | 10/2000 | Yeon |
| 9,190,862 B2 | 11/2015 | Kun et al. |
| 10,110,037 B2 | 10/2018 | Ouyang |
| 10,389,151 B2 | 8/2019 | Ravi et al. |
| 10,630,098 B2 | 4/2020 | Sakakibara et al. |
| 10,651,662 B2 | 5/2020 | Lee et al. |
| 10,693,177 B2 | 6/2020 | Park |

(Continued)

*Primary Examiner* — Julian D Huffman
*Assistant Examiner* — Lisa Kotowski
(74) *Attorney, Agent, or Firm* — Jeremy J. Klobucar (57) ABSTRACT

Electrified vehicle battery overcharge protection techniques monitor an intelligent battery sensor (IBS) current signal via a controller area network communication (CAN-C) bus and an output current of an auxiliary power module (APM) when the IBS current signal is unavailable. A controller then intelligently adjusts charging of the battery system to be battery current-based, battery temperature-based, or at predetermined constant value, based on a determined validity of the IBS current signal, the measured battery system current, and an awake/asleep status and responsiveness of the CAN-C bus.

18 Claims, 4 Drawing Sheets

(56) References Cited

U.S. PATENT DOCUMENTS

| | | | |
|---|---|---|---|
| 2010/0181828 A1* | 7/2010 | Handa | H02J 7/1423 |
| | | | 307/9.1 |
| 2012/0200968 A1 | 8/2012 | Altemose et al. | |
| 2012/0313573 A1 | 12/2012 | Lim et al. | |
| 2017/0358936 A1* | 12/2017 | Kang | H01M 10/482 |
| 2021/0258186 A1* | 8/2021 | Tokunaga | H04L 12/40039 |
| 2022/0239119 A1* | 7/2022 | Liu | H01M 10/482 |

* cited by examiner

CURRENT REGULATION OVERCHARGE PROTECTION FOR VEHICLE BATTERY SYSTEMS

CROSS-REFERENCE TO RELATED APPLICATION

The present application claims the benefit of U.S. Provisional Application No. 63/279,201, filed on Nov. 15, 2021. The disclose of the above-identified application is hereby incorporated by reference in its entirety.

FIELD

The present application generally relates to vehicle battery systems and, more particularly, to techniques for current regulation overcharge protection for vehicle battery systems.

BACKGROUND

Vehicles typically include one or more low voltage batteries (e.g., 12 volt (V) lead-acid batteries) for cranking/starting an internal combustion engine and/or for powering low voltage vehicle accessory components. These batteries are typically recharged via current generated by an engine-driven alternator or DC-DC converter. In the event of abnormally high recharging currents while the batteries have a low state of charge (SOC), the batteries could be overcharged and "swell," which could potentially shorten the life of the batteries.

Conventional overcharge protection techniques include electrical and mechanical systems that retroactively disable recharging based on battery voltage monitoring. These techniques utilize a voltage charging setpoint that is only based on battery temperature. Battery temperature, however, changes over time based on other factors such as charging current and ambient temperature. Accordingly, while such conventional battery overcharge protection techniques do work for their intended purpose, there exists an opportunity for improvement in the relevant art.

SUMMARY

According to one example aspect of the invention, an overcharge protection system for a battery system of an electrified vehicle is presented. In one exemplary implementation, the overcharge protection system comprises an intelligent battery sensor (IBS) configured to generate an IBS current signal indicative a measured current at the battery system and a controller in communication with the IBS via a controller area network communication (CAN-C) bus and configured to determine whether the IBS current signal is available based on an awake/asleep status of the CAN-C bus, when the IBS current signal is unavailable because the CAN-C bus status is asleep, monitor an output current of an auxiliary power module (APM) configured to control a direct current (DC)-to-DC (DC-DC) converter, based on a comparison of the monitored APM output current and a first predefined maximum current threshold, selectively request the CAN-C bus to transition to the awake status and obtain the IBS current signal from the IBS, determine whether the IBS current signal is valid based on a comparison of the IBS current signal to a set of expected values, and based on the determined validity of the IBS current signal, the measured battery system current, and the CAN-C bus status, adjust a charging voltage set point for the APM for the battery system to be battery current-based, battery temperature-based, or a predetermined constant value.

In some implementations, when the IBS current signal is invalid and the request to transition the CAN-C bus to the awake status was generated, the controller is configured to adjust the charging voltage set point to the predetermined constant value. In some implementations, when the IBS current signal is invalid and the request to transition the CAN-C bus to the awake status was not generated, the controller is configured to perform battery temperature-based adjusting of the charging voltage set point. In some implementations, the controller is further configured to cancel the request to transition the CAN-C bus to the awake status for energy saving purposes.

In some implementations, when the IBS current signal is valid and its value is higher than a second predefined maximum threshold, the controller is configured to perform battery current-based adjusting of the charging voltage set point to ensure the charging current does not exceed the second predefined maximum threshold until at least a next key cycle. In some implementations, when the IBS current signal is valid and its value is lower than the predefined maximum threshold, the controller is configured to perform temperature-based adjusting of the charging voltage set point. In some implementations, the controller is further configured to cancel the request to transition the CAN-C bus to the awake status for energy saving purposes.

In some implementations, the controller is further configured to perform the battery current-based control of the charging voltage set point for the APM for the battery system using a gain adjustable integrator with an integral anti-windup. In some implementations, the gain adjustable integrator with the integral anti-windup comprises (i) applying a low-pass filter to the IBS current signal to remove high-frequency noise and (ii) applying a rate limiter to and constraining the charging voltage set point to avoid steady-state error in step input tracking.

According to another example aspect of the invention, an overcharge protection method for a battery system of an electrified vehicle is presented. In one exemplary implementation, the overcharge protection method comprises receiving, by a controller and from an intelligent battery sensor (IBS) via a controller area network communication (CAN-C) bus, an IBS current signal indicative a measured current at the battery system, determining, by the controller whether the IBS current signal is available based on an awake/asleep status of the CAN-C bus, monitoring, by the controller, an output current of an auxiliary power module (APM) when the IBS current signal is unavailable because the CAN-C bus status is asleep, wherein the APM is configured to control a direct current (DC)-to-DC (DC-DC) converter, selectively requesting, by the controller, the CAN-C bus to transition to the awake status based on a comparison of the monitored APM output current and a first predefined maximum current threshold and thereby obtain the IBS current signal from the IBS, determining, by the controller, whether the IBS current signal is valid based on a comparison of the IBS current signal to a set of expected values, and adjusting, by the controller, a charging voltage set point for the APM for the battery system to be battery current-based, battery temperature-based, or a predetermined constant value, based on the determined validity of the IBS current signal, the measured battery system current, and the CAN-C bus status.

In some implementations, the method further comprises adjusting, by the controller, the charging voltage set point to the predetermined constant value when the IBS current signal is invalid and the request to transition the CAN-C bus to the awake status was generated. In some implementations, the method further comprises performing, by the controller, battery temperature-based adjusting of the charging voltage set point when the IBS current signal is invalid and the request to transition the CAN-C bus to the awake status was not generated. In some implementations, the method further comprises canceling, by the controller, the request to transition the CAN-C bus to the awake status for energy saving purposes.

In some implementations, performing, by the controller, battery current-based adjusting of the charging voltage set point when the IBS current signal is valid and its value is higher than a second predefined maximum threshold to thereby ensure the charging current does not exceed the second predefined maximum threshold until at least a next key cycle. In some implementations, the method further comprises performing, by the controller, temperature-based adjusting of the charging voltage set point when the IBS current signal is valid and its value is lower than the predefined maximum threshold. In some implementations, the method further comprises canceling, by the controller, the request to transition the CAN-C bus to the awake status for energy saving purposes.

In some implementations, the method further comprises performing, by the controller, the battery current-based control of the charging voltage set point for the APM for the battery system using a gain adjustable integrator with an integral anti-windup. In some implementations, the gain adjustable integrator with the integral anti-windup comprises (i) applying a low-pass filter to the IBS current signal to remove high-frequency noise and (ii) applying a rate limiter to and constraining the charging voltage set point to avoid steady-state error in step input tracking.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, conventional battery overcharge protection techniques utilize devices such as electrical overcharge protection devices and mechanical overcharge protection devices. The electrical overcharge protection devices continuously sense the voltage of a battery cell, and the sensor is connected to one of the cells in the battery module. When the battery cell is overcharged and the voltage of the battery cell exceeds a certain voltage, the electrical overcharge protection device opens the switch of a main relay by interrupting the supply of voltage applied to the actuation coil of the main relay, hereby the electrical connection between the battery module and the charging power source or load is disconnected. The mechanical overcharge protection devices, on the other hand, continuously monitor if a battery cell is abnormally swelling, and the monitor is connected to one of the cells in a battery module.

When the battery cell is overcharged and the internal pressure thereof increases, the battery cell swells and causes the mechanical overcharge protection device to open the switch of a main relay by opening a closed circuit that includes the actuation coil of the main relay, whereby the electrical connection between the battery module and the charging power source or load is disconnected. As previously discussed, these techniques utilize a voltage charging setpoint that is only based on battery temperature. Battery temperature, however, changes over time based on other factors such as charging current and ambient temperature. Furthermore, another drawback is that the power source disconnection will cause system failure for vehicles. For example, the 12 volt (V) battery is the power source of the low voltage systems such as controllers, fans, pumps, valves, accessory devices, etc. Disconnection of the power source from an auxiliary power module (APM) will eventually deplete the 12V battery and cause the low voltage system losing functionalities. Yet another drawback is that the mechanism takes reaction when the battery is already overcharged and swelling. The remedial reaction can stop further damage of the battery, but it cannot prevent the overcharge from happening.

Accordingly, improved battery overcharge protection techniques for electrified vehicles are presented. These techniques improve the conventional charging control method by avoiding abnormal high current overcharging the 12V lead-acid batteries. These techniques operate with the low voltage (e.g., 12V) battery control system of electrified vehicles (e.g., battery electric vehicles, or BEVs, and hybrid electric vehicles, or HEVs), which typically includes an HCP (Hybrid Control Processor), an APM, an IBS (Intelligent Battery Sensor), a BCM (Body Control Module), a 12V lead-acid battery, and a high voltage battery pack. This overcharge protection or prevention includes three primary aspects: (1) immediate detection of high charging current even when the battery current signal is invalid; (2) smartly adjusts the charging voltage set point for the APM (i.e., for a respective direct current (DC)-to-DC (DC-DC) converter) for the battery system by switching the control laws according to different conditions of charging current, battery temperature, and the validity of sensor signals; and (3) achieving accurate current control and avoiding noise interference against the system. This third (3) aspect could include, for example, using a gain adjustable integrator with an integral anti-windup, which may have been previously used in current tracking but has never been used in battery overcharge protection.

Figure 1:
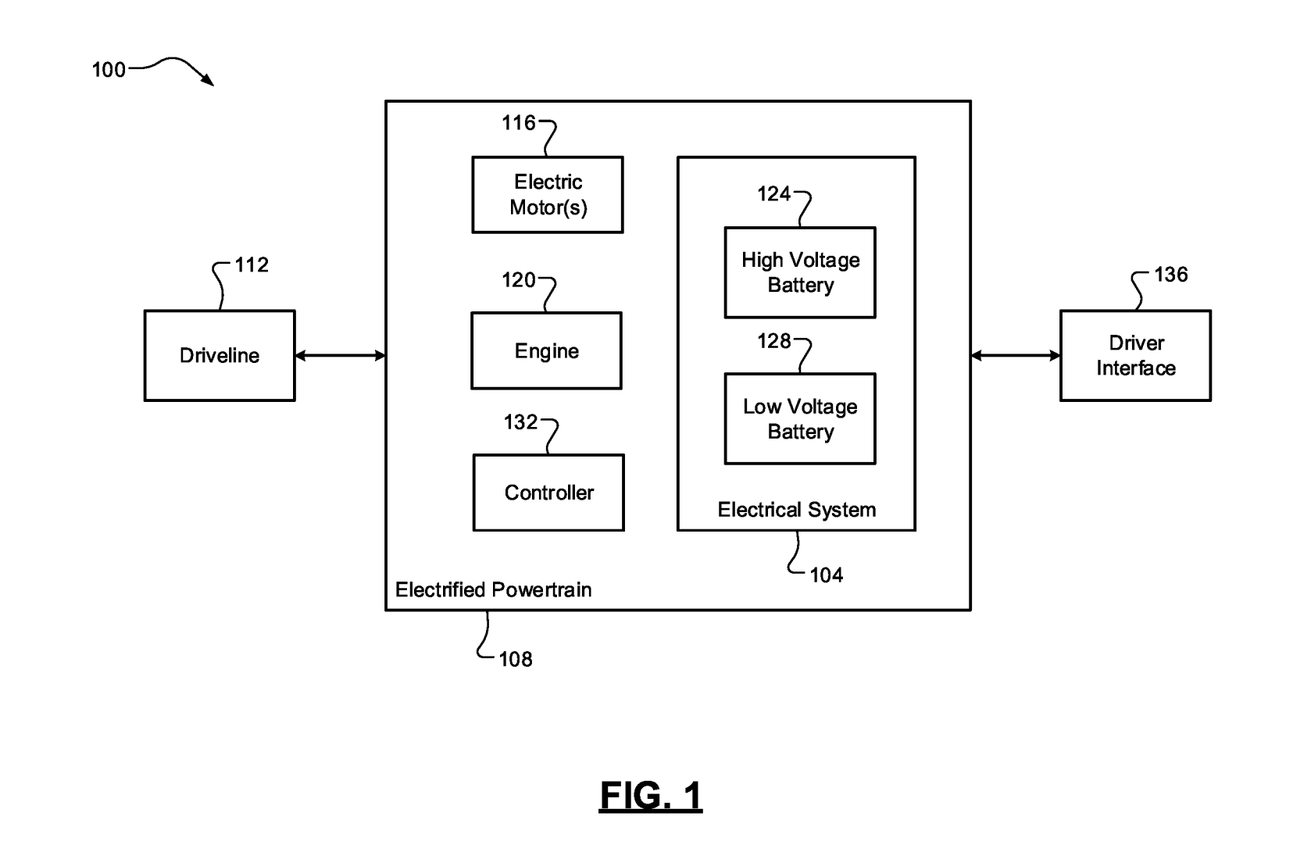
FIG. 1 is a functional block diagram of an electrified vehicle having an example electrical system according to the principles of the present application.

Referring now to FIG. 1, a functional block diagram of an electrified vehicle 100 having an example electrical system 104 according to the principles of the present application is illustrated. The electrified vehicle 100 generally comprises an electrified powertrain 108 configured to generate and transfer drive torque to a driveline 112 for vehicle propulsion. The electrified powertrain 108 could include one or more electric motors 116 and an optional internal combustion engine 120.

The electrical system 104 is configured to power the electrified powertrain 108 (specifically, the electric motor(s) 116) and generally comprises a high voltage battery system 124 and a low voltage battery system 128 (e.g., a 12V lead-acid battery). A controller 132 (e.g., an HCP) controls operation of the electrified powertrain 104 and a driver interface 136 is configured to receive driver input (e.g., a driver torque request) and output information to the driver. The electrical system 104 also includes other non-illustrated components as previously discussed above and that will now be described in greater detail, including an overcharge protection system according to the principles of the present application.

Figure 2:
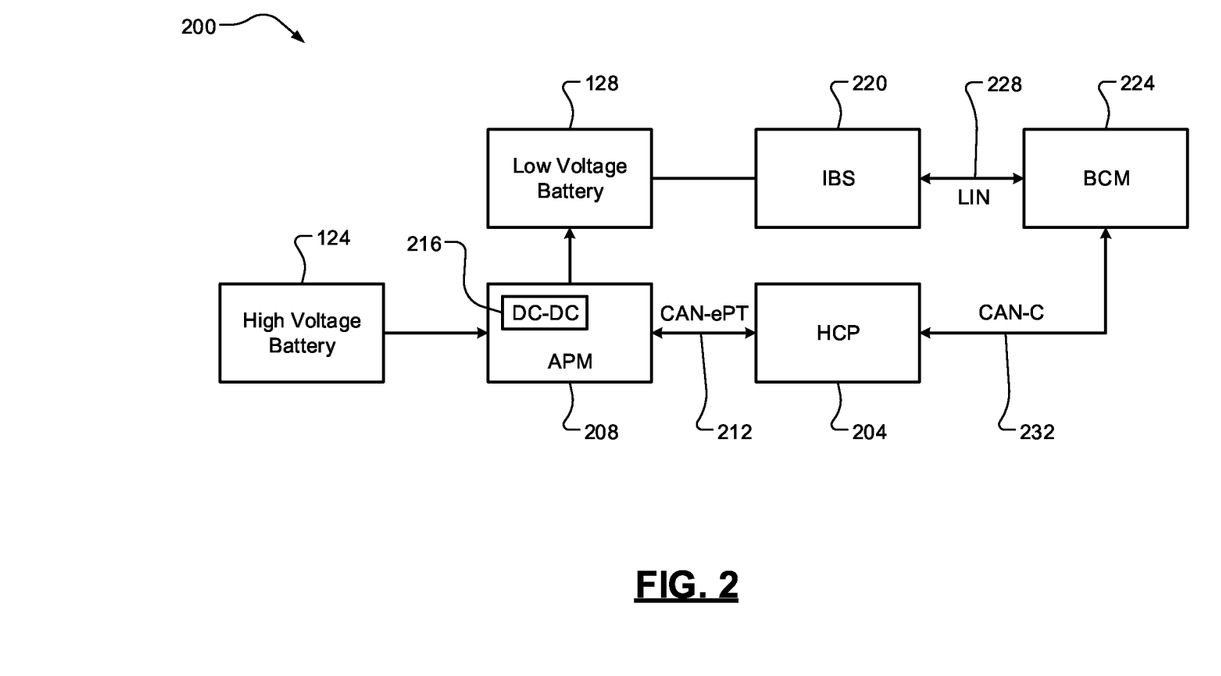
FIG. 2 is a functional block diagram of a portion of an example electrical system of an electrified vehicle according to the principles of the present application.

Referring now to FIG. 2, a functional block diagram of a portion 200 of the example electrical system 104 of an electrified vehicle 100 according to the principles of the present application is illustrated. An HCP 204 processes the control logic based on the input signals such as current, voltage, temperature, etc., and outputs the charging voltage set point to the APM 208. It will be appreciated that the HCP 204 could be the controller 132 as illustrated in FIG. 1 and otherwise described herein. The connection between the HCP 204 and the APM is via CAN-ePT bus 212. The APM controls a DC/DC buck converter 216, which can be separate or integrated therein.

The DC/DC buck converter 216 converts the high voltage power of battery 124 to low voltage power for charging the low voltage battery 128. The APM 208 receives command signals and desired charging voltage set point from the HCP 204. The APM also has its own sensors to monitor the output current, voltage, power, etc., and the sensed signals are sent back to the HCP 204. The IBS 220 also senses the current, voltage, and temperature signals of the low voltage battery 128. The sensed signals are sent to a BCM 224 through a LIN (Local Interconnect Network) bus 228. The BCM 224 bypasses the IBS signals to the HCP 204. The connection between the HCP 204 and the BCM 224 is via a controller area network communication (CAN-C) bus 232.

Figure 3:
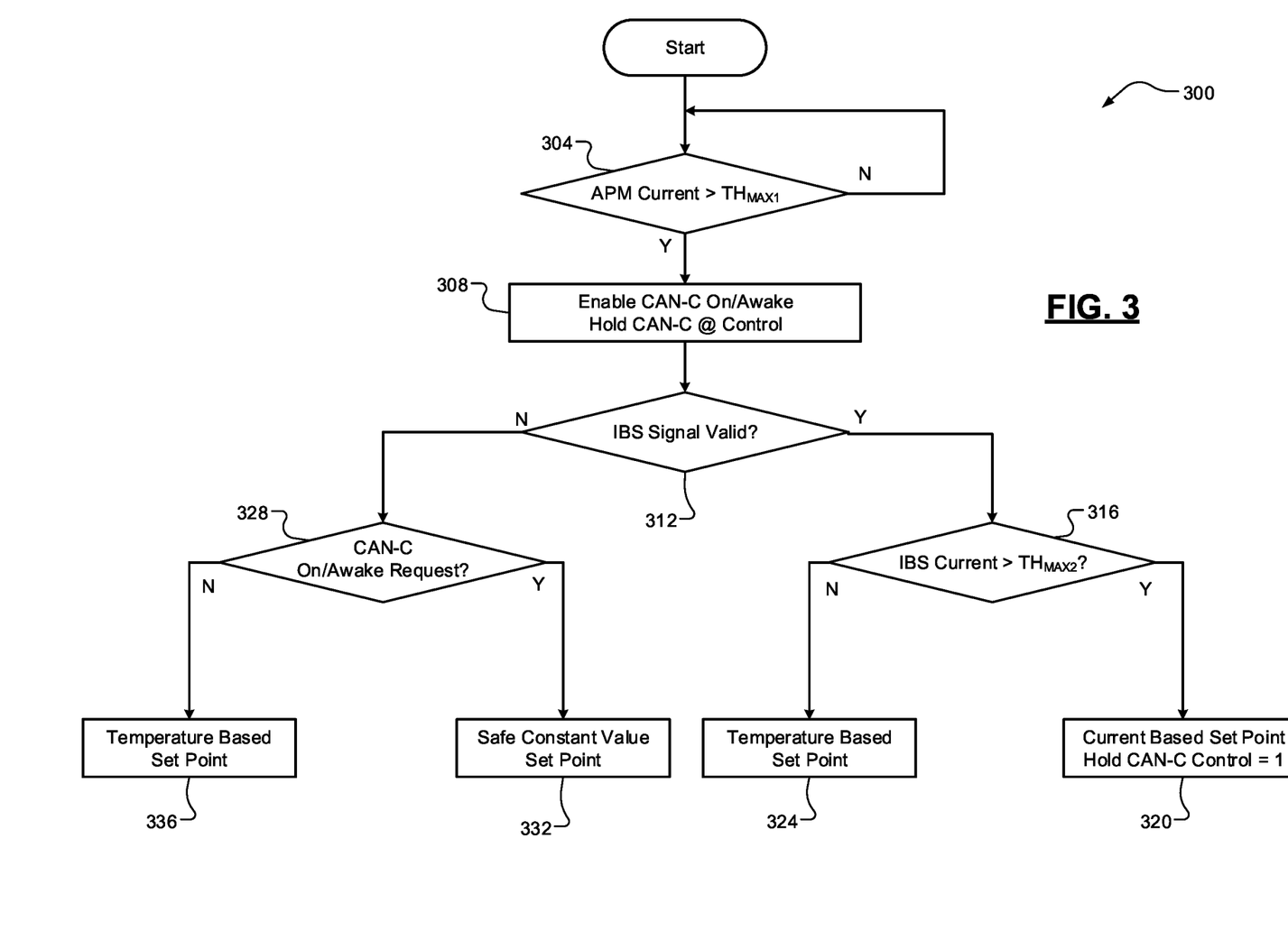
FIG. 3 is a flow diagram of an example battery overcharge protection control method according to the principles of the present application.

Referring now to FIG. 3, a flow diagram of an example battery overcharge protection method 300 according to the principles of the present application is illustrated. While the components of the electrified vehicle 100 and its example electrical system 104/200 are specifically referenced, it will be appreciated that this method 300 could be applicable to any suitable electrified vehicle electrical system. At 304, the controller 132 determines the APM measured/monitored current is greater than a first maximum threshold ($TH_{MAX1}$). When true, the method 300 proceeds to 308. Otherwise, the method 300 returns to 304. At 308, the controller 132 enables the CAN-C network to transition to the awake status and holds the CAN-C network at this control status. At 312, the controller 132 determines whether the IBS current signal is valid. This could include, for example, verifying that there are no malfunctions of the IBS 220 or its related components and that the IBS current signal is within a range of expected values. When true, the method 300 proceeds to 316. Otherwise, the method 300 proceeds to 328.

At 316, the controller 132 determines whether the IBS current signal is larger than the second maximum threshold $TH_{MAX2}$, which could be less than the first maximum threshold $TH_{MAX1}$. When true, current-based set control is performed at 320 by using a current-based set point for the voltage set point for the APM and DC-DC converter control and the CAN-C status is held awake. The method 300 then ends or returns to 304. When false, temperature-based control is performed at 324 using a temperature-based setpoint for the voltage set point for the APM and DC-DC converter and the method 300 ends or returns to 304. The CAN-C awake request could also be canceled to save power/energy. At 328, the controller 132 checks the previous CAN-C wake-up request. When verified, constant value control is performed at 332 using a constant value for the voltage set point for the APM and DC-DC converter and the method 300 ends or returns to 304. Otherwise, at 336, temperature-based control is performed using a temperature-based setpoint for the voltage set point for the APM and DC-DC converter and the method 300 ends or returns to 304. The CAN-C awake request could also be canceled to save power/energy.

Figure 4:
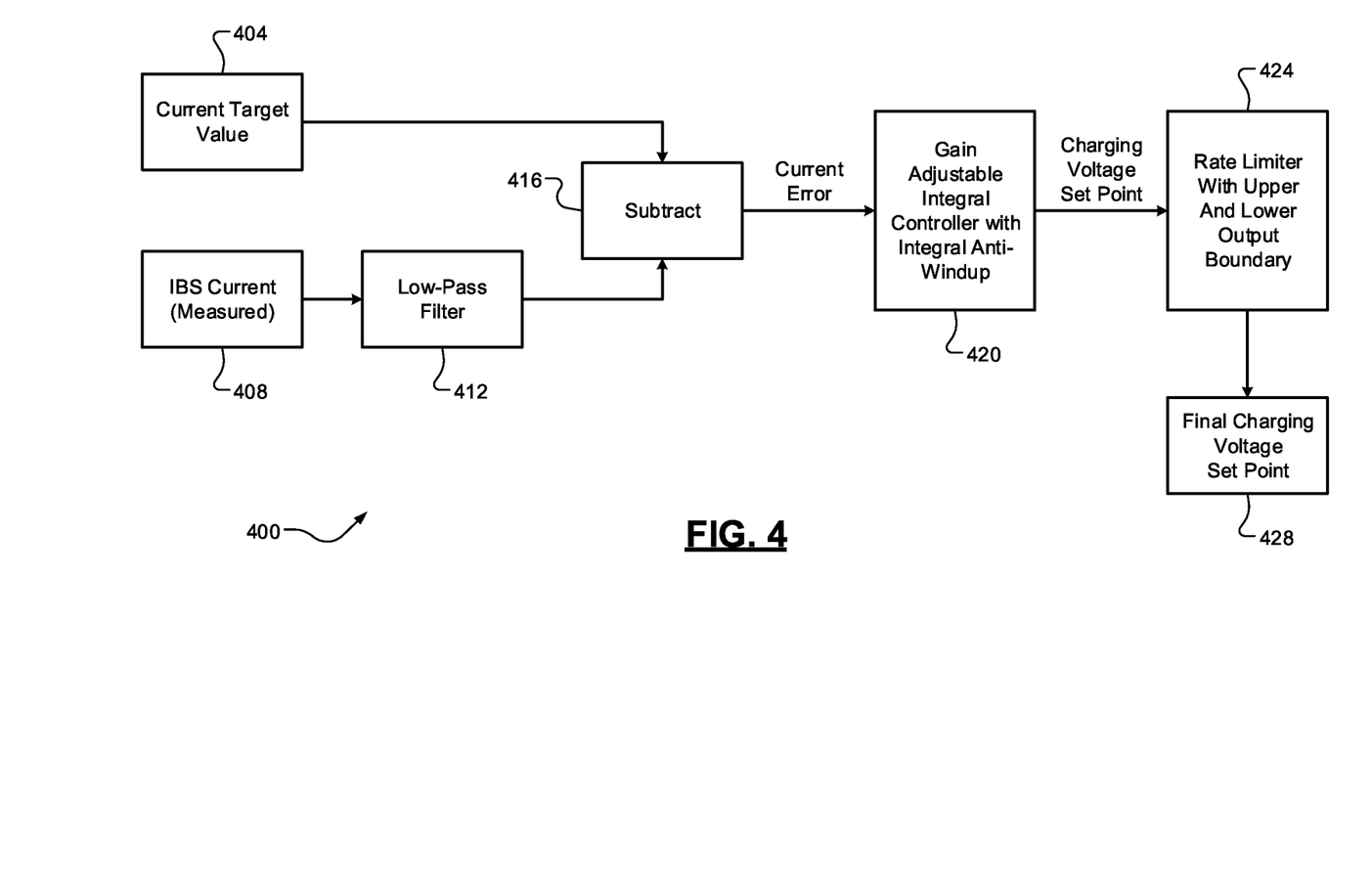
FIG. 4 is a functional block diagram of an example control architecture configured for battery overcharge protection according to the principles of the present application.

Referring now to FIG. 4, an example current control architecture 400 (also referred to as "current controller 400") according to the principles of the present application is illustrated. The current controller 400 is one part of the current regulation overcharge protection. A similar current control architecture may have been previously used in constant current charging controls (i.e., fast charging control/tracking), but they have not been used in an overcharge protection method as proposed herein. When used in an overcharge protection method, the current controller 400 regulates the charging current to prevent the current from exceeding the predefined maximum threshold. Despite the differences in application, the control law design of the current regulation overcharge protection is also different from previously known methods, which normally use PID (Proportional-Integral-Derivative) or PI (Proportional-Integral) controller, while the current regulation overcharge protection of the present application uses the gain adjustable integrator with an integral anti-windup method as described in greater detail below The idea behind this design is that, based on the system dynamics modeling and analysis, conventional low voltage charging systems suffer from two primary flaws: (1) high-pass characteristics and (2) zero-system type. The high pass characteristics amplifies high frequency noise. The zero-system type, on the other hand, causes the steady-state error for tracking a step input. To optimize the control system, the current controller 400 is designed by using a gain adjustable integrator with an integral anti-windup (box 420), so as to achieve the goals of accurate current control and anti-noise interference. The IBS current 408 is filtrated by a low pass filter 412. The target current 404 subtracts at 412 the filtrated current to obtain the input of the current controller 400. The calculated result of the current controller will go through a rate limiter 424 to prevent the rapid change of the output value. This output value 428 is constrained in a proper range set by the system, and will be sent to the APM as the charging voltage set point.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An overcharge protection system for a battery system of an electrified vehicle, the overcharge protection system comprising:
    an intelligent battery sensor (IBS) configured to generate an IBS current signal indicative of a measured current at the battery system;
    a controller in communication with the IBS via a controller area network communication (CAN-C) bus and configured to:
        determine whether the IBS current signal is available based on an awake/asleep status of the CAN-C bus;
        when the IBS current signal is unavailable because the CAN-C bus status is asleep, monitor an output current of an auxiliary power module (APM) configured to control a direct current (DC)-to-DC (DC-DC) converter;
        based on a comparison of the monitored APM output current and a first predefined maximum current threshold, selectively request the CAN-C bus to transition to the awake status and obtain the IBS current signal from the IBS;
        determine whether the IBS current signal is valid based on a comparison of the IBS current signal to a set of expected values; and
        based on the determined validity of the IBS current signal, the measured battery system current, and the CAN-C bus status, adjust a charging voltage set point for the APM for the battery system to be battery current-based, battery temperature-based, or a predetermined constant value.

2. The overcharge protection system of claim 1, wherein when the IBS current signal is invalid and the request to transition the CAN-C bus to the awake status was generated, the controller is configured to adjust the charging voltage set point to the predetermined constant value.

3. The overcharge protection system of claim 1, wherein when the IBS current signal is invalid and the request to transition the CAN-C bus to the awake status was not generated, the controller is configured to perform battery temperature-based adjusting of the charging voltage set point.

4. The overcharge protection system of claim 3, wherein the controller is further configured to cancel the request to transition the CAN-C bus to the awake status for energy saving purposes.

5. The overcharge protection system of claim 1, wherein when the IBS current signal is valid and its value is higher than a second predefined maximum threshold, the controller is configured to perform battery current-based adjusting of the charging voltage set point to ensure the charging current does not exceed the second predefined maximum threshold until at least a next key cycle.

6. The overcharge protection system of claim 1, wherein when the IBS current signal is valid and its value is lower than the predefined maximum threshold, the controller is configured to perform temperature-based adjusting of the charging voltage set point.

7. The overcharge protection system of claim 6, wherein the controller is further configured to cancel the request to transition the CAN-C bus to the awake status for energy saving purposes.

8. The overcharge protection system of claim 1, wherein the controller is further configured to perform the battery current-based control of the charging voltage set point for the APM for the battery system using a gain adjustable integrator with an integral anti-windup.

9. The overcharge protection system of claim 1, wherein the gain adjustable integrator with the integral anti-windup comprises (i) applying a low-pass filter to the IBS current signal to remove high-frequency noise and (ii) applying a rate limiter to and constraining the charging voltage set point to avoid steady-state error in step input tracking.

10. An overcharge protection method for a battery system of an electrified vehicle, the overcharge protection method comprising:
    receiving, by a controller and from an intelligent battery sensor (IBS) via a controller area network communication (CAN-C) bus, an IBS current signal indicative of a measured current at the battery system;
    determining, by the controller, whether the IBS current signal is available based on an awake/asleep status of the CAN-C bus;
    monitoring, by the controller, an output current of an auxiliary power module (APM) when the IBS current signal is unavailable because the CAN-C bus status is asleep, wherein the APM is configured to control a direct current (DC)-to-DC (DC-DC) converter;
    selectively requesting, by the controller, the CAN-C bus to transition to the awake status based on a comparison of the monitored APM output current and a first predefined maximum current threshold and thereby obtain the IBS current signal from the IBS;
    determining, by the controller, whether the IBS current signal is valid based on a comparison of the IBS current signal to a set of expected values; and
    adjusting, by the controller, a charging voltage set point for the APM for the battery system to be battery current-based, battery temperature-based, or a predetermined constant value, based on the determined validity of the IBS current signal, the measured battery system current, and the CAN-C bus status.

11. The overcharge protection method of claim 10, further comprising adjusting, by the controller, the charging voltage set point to the predetermined constant value when the IBS current signal is invalid and the request to transition the CAN-C bus to the awake status was generated.

12. The overcharge protection method of claim 10, further comprising performing, by the controller, battery temperature-based adjusting of the charging voltage set point when the IBS current signal is invalid and the request to transition the CAN-C bus to the awake status was not generated.

13. The overcharge protection method of claim 12, further comprising canceling, by the controller, the request to transition the CAN-C bus to the awake status for energy saving purposes.

14. The overcharge protection method of claim 10, performing, by the controller, battery current-based adjusting of the charging voltage set point when the IBS current signal is valid and its value is higher than a second predefined maximum threshold to thereby ensure the charging current does not exceed the second predefined maximum threshold until at least a next key cycle.

15. The overcharge protection method of claim 10, further comprising performing, by the controller, temperature-based adjusting of the charging voltage set point when the IBS current signal is valid and its value is lower than the predefined maximum threshold.

16. The overcharge protection method of claim 15, further comprising canceling, by the controller, the request to transition the CAN-C bus to the awake status for energy saving purposes.

17. The overcharge protection method of claim 10, further comprising performing, by the controller, the battery current-based control of the charging voltage set point for the APM for the battery system using a gain adjustable integrator with an integral anti-windup.

18. The overcharge protection method of claim 10, wherein the gain adjustable integrator with the integral anti-windup comprises (i) applying a low-pass filter to the IBS current signal to remove high-frequency noise and (ii) applying a rate limiter to and constraining the charging voltage set point to avoid steady-state error in step input tracking.

\* \* \* \* \*